United States Patent [19]

Piepho et al.

[11] Patent Number: 5,089,586

[45] Date of Patent: Feb. 18, 1992

[54] WATER-DISPERSIBLE ALLYL URETHANES AND THEIR USE FOR THE PRODUCTION OF PAINTS

[75] Inventors: Michael Piepho, Elze; Lutz Hoppe, Walsrode; Erhard Lühmann, Bomlitz, all of Fed. Rep. of Germany

[73] Assignee: Wolff Walsrode Aktiengesellschaft, Walsrode, Fed. Rep. of Germany

[21] Appl. No.: 394,601

[22] Filed: Aug. 16, 1989

[30] Foreign Application Priority Data

Sep. 1, 1988 [DE] Fed. Rep. of Germany ....... 3829588

[51] Int. Cl.⁵ .................. C08G 18/68; C08L 75/68
[52] U.S. Cl. ......................... 528/75; 528/49; 528/60; 528/65; 528/66; 528/81; 528/83
[58] Field of Search .............. 528/75, 49, 60, 65, 528/66

[56] References Cited

U.S. PATENT DOCUMENTS

| | | | |
|---|---|---|---|
| 3,686,147 | 8/1972 | Massoubre et al. | 525/440 |
| 4,312,798 | 1/1982 | Kovacs | 528/66 |
| 4,760,111 | 7/1988 | Ambrose et al. | 528/75 |

OTHER PUBLICATIONS

Chemical Abstracts, vol. 79, Abstract No. 54991y.
Chemical Abstracts, vol. 105, Abstract No. 116713a.

*Primary Examiner*—John Kight, III
*Assistant Examiner*—Duc Truong
*Attorney, Agent, or Firm*—Sprung Horn Kramer & Woods

[57] ABSTRACT

Improved water-dispersible allyl urethanes are obtainable by reaction of a polyglycol mixture with a hydroxyallyl compound and an isocyanate containing at least two NCO groups, the allyl urethane being nonionic.

10 Claims, No Drawings

WATER-DISPERSIBLE ALLYL URETHANES AND THEIR USE FOR THE PRODUCTION OF PAINTS

This invention relates to new water-dispersible allyl urethanes, to a process for their production and to their use for the production of paints.

In the more recent past, there has been an increasing trend in the paint industry towards environment-friendly (i.e. solvent- and monomer-free) products (cf. for example O. Lückert, Emissionsarm Lackieren, C. R. Vincentz-Verlag, Hannover, 1987). Paint raw materials containing urethane groups are known for the production of elastic, abrasion-resistant coatings having hard and tough properties. Polyurethane products of the type in question are used, for example, in the form of radiation-curable urethane acrylates (cf. for example M. S. Salim, Polymers Paint Colour Journal, 177, Nov. 1987, 760, and W. Fischer, Industrie-Lackierbetrieb, 55, 1987, No. 7, page 245). However, paints of this type (polyurethane acrylates), which are diluted with reactive diluents based on low molecular weight acrylates, can have physiological disadvantages because acrylates can cause skin irritation. This applies in particular to the acrylate-based reactive diluents normally used to obtain reduced paint viscosity.

Another possibility for adjusting the processing viscosity of urethane acrylates is to use inert organic solvents which, after application of the coating compounds, evaporate before chemical curing of the binders and thus pollute the air (cf. CA-P 1 192 331).

Commercially available acrylate-free products for coating surfaces include unsaturated polyesters dissolved in styrene, although they are being used increasingly less on account of the physiological disadvantages of styrene. The most environment-friendly and physiologically safe diluent for adjusting the processing viscosity of lacquer binders is water. DE-A-3 437 918 describes water-dilutable oligourethane acrylates for leather lacquers; unfortunately, these acrylates are not suitable for the open-pore coating of wood.

Acrylate-free, water-dilutable, polymerizable lacquer binders are described in EP-A-0 182 147. However, the products described therein do not meet the increased requirements as for example elasticity, pore flow and optical properties have to satisfy.

Water-dispersible, acrylate-free, polymerizable lacquer binders containing urethane groups are also described in DE-OS 2 256 806. However, these products are not suitable for the open-pore coating of wood and, in addition, can only be emulsified after addition of amine bases. Products such as these are not sufficiently storage stable (H. Blum et al, Farbe & Lack, 94, 342 (1988)). Another serious disadvantage of these products is that their application involves baking with evaporation of the amines.

The object of the present invention is to provide water-dispersible polymerizable compounds which are suitable as lacquer binders, more especially for the production of tough elastic and also open-pore wood coatings which show only minimal penetration into the wood substrate.

The present invention relates to water-dispersible allyl urethanes of at least one allyl compound, at least one polyol and at least one isocyanate, characterized in that the allyl urethanes are obtainable by reaction of A) a polyglycol mixture I or its reaction product with a polycarboxylic acid II or a derivative IIa thereof with
B) a hydroxyallyl compound III and an isocyanate compound IV containing at least two NCO groups, the allyl urethane being non-ionic.

In one preferred embodiment, the molar ratio of polyols having a molecular weight below 1000 to polyols having a molecular weight of at least 1000 in the polyol mixture I is between 10 and 50 and more especially between 20 and 40. For the purposes of the present invention, molecular weight is defined as the weight average $M_w$.

In another preferred embodiment, the above-mentioned polyglycol mixture I is reacted with a non-aromatic unsaturated carboxylic acid containing at least two carboxyl groups, more especially a dicarboxylic acid or the corresponding anhydride.

The water-dispersible allyl urethanes according to the invention preferably have the following properties:
molecular weight: 1500–10000
viscosity (mPa.s) as measured in accordance with DIN 53 019 T 1: >3000 at 20° C. in undiluted form.

Particularly preferred allyl urethanes according to the invention are obtainable by reaction of starting product A which, in turn, is obtainable by reaction of

| 1. | 0.03–0.1 | mol | polyethylene glycol having a molecular weight of at least 2000 but less than 1000, optionally branched, and preferably |
| | 0.04–0.07 | mol | polyethylene glycol 300–600 |
| 2. | 0.002–0.02 | mol | polyethylene glycol 1000–5000, optionally branched, and preferably |
| | 0.003–0.008 | mol | polyethylene glycol 1500–3000 |
| 3. | 0.00–0.3 | mol | polypropylene glycol 200–1000 or branched polypropylene glycols and preferably |
| | 0.05–0.2 | mol | |
| 4. | 0.0–0.25 | mol | polycarboxylic acid or polycarboxylic anhydride and preferably |
| | 0.1–0.18 | mol. | |

After reaction of components 1 to 4, starting product A contains terminal OH groups due to a stoichiometric excess of hydroxyl groups over the carboxyl groups.

Now, the allyl urethanes according to the invention are obtainable by further reaction of starting product A in a second reaction step B, in which 0.15 mol hydroxyl groups of starting product A are reacted with

| 5. | 0.05–0.35 mol | of the hydroxyallyl compound III and more especially with |
| | 0.1–0.2 mol | of the hydroxyallyl compound III and |
| 6. | 0.1–0.5 mol | NCO groups of the isocyanate compound IV and more especially with |
| | 0.16–0.32 mol | NCO groups of the isocyanate compound IV, | complete reaction with the hydroxyl groups ensuring there is no residual content of isocyanate groups.

The present invention also relates to a process for the production of the allyl urethanes according to the invention by reaction of a starting product A containing the above-mentioned polyol mixture I and, optionally, a polycarboxylic acid II or a derivative IIa thereof with D) a hydroxyallyl compound III and an isocyanate IV containing at least two isocyanate groups, the allyl urethane obtained being non-ionic.

The present invention also relates to a lacquer: containing the allyl urethanes according to the invention dispersed in water and to a process for painting rigid or flexible substrates with a paint containing an allyl urethane according to the invention.

In the production of starting product A using a polycarboxylic acid, various hydrophilic and hydrophobic polyalkylene glycols are condensed in the melt (cf. for example D. Braun, H. Cherdron, W. Kern, Praktikum der makromolekularen organischem Chemie, Hüthig-Verlag, Heidelberg, 3rd Edition, 1979, page 69) in combination with polycarboxylic acids or the corresponding anhydrides (preferably maleic anhydride), optionally under vacuum at temperatures in the range from about 150° to 250° C.

The catalysts used may be concentrated mineral acids, such as hydrochloric acid, or sulfonic acids, such as p-toluenesulfonic acid. Instead of 2., it is also possible to use ethylene oxide/propylene oxide copolymers.

Preferred polyglycols are polymers of ethylene oxide and/or propylene oxide; graft polymers of propylene oxide or ethylene oxide on polyols, i.e. branched polyalkylene glycols, may also be used. Suitable polyols are, for example, trimethylolpropane, glycerol, sorbitol and pentaerythritol.

Preferred polycarboxylic acids II are maleic acid, phthalic acid, hydrogenated phthalic acid, adipic acid, succinic acid, fumaric acid, malonic acid, valeric acid and itaconic acid or derivatives II$a$ thereof, particularly anhydrides, and also OH-substituted polycarboxylic acids II$a$. The particularly preferred derivative II$a$ is maleic anhydride.

Preferred hydroxyallyl compounds III are trimethylolpropane monoallyl ether, trimethylolpropane diallyl ether, pentaerythritol diallyl ether, pentaerythritol triallyl ether, glycerol monoallyl ether and/or glycerol diallyl ether. Trimethylolpropane diallyl ether is preferred. Allyl alcohol may also be used, likewise methallyl compounds and saccharide derivatives containing allyl groups.

Preferred isocyanates IV are isophorone diisocyanate, trimethyl hexamethylene diisocyanate, hexamethylene diisocyanate, dicyclohexyl methane diisocyanate, MDI (diphenylmethane diisocyanate), TDI (tolylene diisocyanate), trans-1,4-cyclohexane diisocyanate and p-phenylene diisocyanate. All the diisocyanates mentioned may also be used in the form of prepolymeric isocyanates, for example biuret or uretdione (cf. G. Oertel, Polyurethane, Carl Hanser Verlag, 1985). Aliphatic or cycloaliphatic isocyanates are particularly suitable for improving light stability.

The reaction between isocyanate and hydroxyl groups may be catalyzed by standard reaction accelerators, such as for example dibutyl tin dilaurate or tertiary amines, such as for example dimethyl benzylamine, or diazabicyclooctane. The reaction mixture may also contain inhibitors, such as for example hydroquinone derivatives or phenothiazine, to prevent premature polymerization of the allyl groups. The second stage of the production process may take place in an inert solvent which can be distilled off again on completion of the reaction (when no more NCO signals appear in the infrared spectrum of the reaction mixture).

An acrylate-free, water-dilutable, radically polymerizable lacquer binder containing urethane groups and allyl and/or methallyl ether units is obtained. There is no need to neutralize excess carboxyl groups with amines to achieve dilutability with water. The polymerization (synonymous with lacquer curing) is preferably carried out by irradiation with high-energy light, such as for example UV light or electron beams. Curing by addition of peroxides or azo compounds is also possible. Siccatives may also be used. The lacquer binders have many of the advantages (for example good levelling and scratch resistance) of urethane acrylates and two-component polyurethane lacquer without any of their disadvantages (physiologically unacceptable isocyanates or acrylate units). The lacquer binders according to the invention may be combined with other standard lacquer raw materials such as, for example, nitrocellulose, polyacrylate resins, alkyd resins, unsaturated polyesters, other radiation-curable components, other lacquer constituents, such as levelling aids, air release agents, flatting agents and pigments. Dilution to the processing viscosity is preferably carried out by addition of water, although it is also possible to use organic diluents. By organic diluents are meant inert organic solvents and also commercial reactive diluents (acrylates, vinyl ethers or other low-viscosity diluents containing CC double bonds). Examples of low-viscosity acrylates are tripropylene glycol diacrylate or methacrylate. Examples of low-viscosity vinyl ethers are tetraethylene glycol divinyl ether and tripropylene glycol divinyl ether.

EXAMPLE 1

0.055 mol polyethylene glycol 400 (22 g), 0.005 mol polyethylene glycol 2000 (10 g), 0.11 mol tripropoxylated trimethylolpropane (34 g), 0.2 g di-tert.-butyl hydroquinone, 0.8 g concentrated hydrochloric acid and 0.153 mol maleic anhydride (15 g) are heated under nitrogen with stirring for 1 hour to 170° C. in a flask. The condensation water (2.7 ml) is removed. After cooling, 0.144 mol isophorone diisocyanate (32 g) and 0.144 mol trimethylolpropane diallyl ether (30.8 g) are added to the hydroxyl-group-containing product obtained in this way, the allyl ether being added first and the diisocyanate then being added dropwise at such a rate that the temperature of the reaction mixture does not exceed 80° C. After the addition, the reaction mixture is heated for 90 minutes at 70° C., after which the emulsifiable allyl urethane product is left to cool. A stable 50% dispersion is obtained by stirring it into 140 ml water.

After addition of 3% (based on solids) photoinitiator (benzophenone/2-hydroxy-2-methyl-1-phenylpropan-1-one=1/1) and coatimg on wood (2×15μ dry layer thickness with sanding in between), followed by evaporation of the water and UV irradiation, a haze-free, open-pore, scratch-resistant film is obtained. The coating shows excellent body and good levelling. The König pendulum hardness (45μ dry layer thickness on glass) is 50 seconds. The film cured by UV light is resistant to the organic solvents ethanol (60 minutes) and acetone (10 s) (in accordance with Group 1 B, DIN 68 861, Part 1, Edition 12/81).

EXAMPLE 2

The procedure is as in Example 1, except that 0.144 mol hexamethylene diisocyanate (24.2 g) is used instead of isophorone diisocyanate. The product obtained is emulsifiable in water. The König-Pendulum hardness of the film coated onto glass by means of a doctor blade with a (dry) thickness of 45μ and cured with UV light was measured to 45 seconds. The lacquer film was haze-free.

Coating onto wood by means of a doctor blade (2×15μ dry layer thickness) gives coatings which show only minimal penetration into the wood substrate (good body), but which still have an open-pore surface. Levelling is very good and the cured coating is scratch-resistant and unaffected by ethanol and acetone (as in Example 1).

EXAMPLE 3

The procedure is as in Example 1, except that the following quantities of raw materials are used:

Step A 0.0625 mol polyethylene glycol 400 (25 g)
0.005 mol polyethylene glycol 2000 (10 g)
0.075 mol tripropoxylated trimethylolpropane (22.5 g)
0.13 mol maleic anhydride (12.5 g)
0.1 g di-tert.-butyl hydroquinone
0.8 g concentrated hydrochloric acid Step B 0.1 mol trimethylolpropane diallyl ether (21.5 g)
0.1 mol isophorone diisocyanate (22.2 g).

The reaction product forms a stable emulsion in water and, applied to glass in a dry layer thickness of 45μ, as described in Example 1, may be cured to form smooth, scratch-resistant films having a König pendulum hardness of approximately 45 s.

Application to wood (2×15μ dry layer thickness with sanding in between) produced open-pore coatings which show very little penetration into the wood substrate (good body). The coatings have tough and elastic properties, but are highly abrasion-resistant and are unaffected by ethanol and acetone (as in Example 1).

COMPARISON EXAMPLE

Example 5 of EP-A-0 182 147 was copied.

The products of Examples 1 to 3 according to the present invention and the product of the Comparison Example were dispersed in water to form dispersions having solids contents of 50% (250 ml water were added dropwise to 250 g product at 250 r.p.m. and then dispersed therein for 30 minutes at 2500 r.p.m.).

1.5% photoinitiators (benzophenone/2-hydroxy-2-methyl-1-phenylpropan-1-one=1/1) were added to the dispersions which were then applied to pine wood by means of a box knife coater (2×15μ dry layer thickness with sanding in between) and dried by means of a jet dryer. The paint films were cured after drying by irradiation with UV light (80 W/cm).

In addition, the dispersions were applied to paper in a thickness of 30μ, dried and cured by UV light. Although comparable values in regard to curing rate, levelling, scratch resistance, sandability and dispersion stability are obtained in the Comparison Example, the Examples according to the invention are superior in regard to body and elasticity and do not penetrate into the substrate.

We claim:

1. Water-dispersible allyl urethanes prepared from an allyl compound, a polyol and an isocyanate, characterized in that they are obainable by reaction of A) a polyglycol mixture I or its reaction product with a polycarboxylic acid II or a derivative IIa thereof with B) a hydroxyallyl compound III and an isocyanate IV containing at least two isocyanate groups, the allyl urethanes being nonionic.

2. Water-dispersible allyl urethanes as claimed in claim 1, characterized in that the molar ratio of polyglycols having a molecular weight below 1000 to polyglycols having a molecular weight of at least 1000 in the polyglycol mixture I is between 10 and 50.

3. Water-dispersible allyl urethanes as claimed in claim 1, characterized in that a non-aromatic α,β-unsaturated carboxylic acid II or a derivative IIa thereof is used in the production process.

4. Water-dispersible allyl urethanes as claimed in claim 1 obtainable by reaction of 0.15 mol hydroxyl groups of starting product A built up of
1. 0.03–0.1 mol of a polyethylene glycol having a molecular weight of at least 200, but below 1000,
2. 0.002–0.02 mol of a polyethylene glycol having a molecular weight of 1000 to 5000,
3. 0.00–0.3 mol of an optionally branched polypropylene glycol having a molecular weight of 200 to 1000 and
4. 0.0–0.25 mol of a polycarboxylic acid II or a derivative IIa thereof with 5. 0.05–0.35 mol of the hydroxyallyl compound III and
6. 0.1–0.5 mol isocyanate groups of the isocyanate compound IV in a reaction step B, all the isocyanate groups being reacted with hydroxyl groups.

5. Water-dispersible allyl urethanes as claimed in claim 1, characterized in that maleic anhydride and/or adipic acid, fumaric acid, malonic acid, phthalic acid, phthalic anhydride, hydrogenated phthalic acid derivatives, itaconic acid, succinic acid, valeric acid and/or citric acid is/are used as the polycarboxylic acid II or derivatives IIa thereof.

6. Water-dispersible allyl urethanes as claimed in claim 1, characterized in that isophorone diisocyanate, hexamethylene diisocyanate, dicyclohexyl methane diisocyanate, MDI or TDI, is used, optionally in prepolymer form, as the isocyanate IV.

7. Water-dispersible allyl urethanes as claimed in claim 1, characterized in that trimethylolpropane diallyl ether and/or trimethylolpropane monoallyl ether, pentaerythritol triallyl ether, glycerol monoallyl ether, glycerol diallyl ether, pentaerythritol diallyl ether, is used as the hydroxyallyl compound III.

8. A process for the production of a water-dispersible allyl urethane as claimed in claim 1 by reaction of A) a polyglycol mixture I or reaction products thereof with a polycarboxylic acid II or a derivative IIa thereof with B) a hydroxyallyl compound III and an isocyanate IV containing at least two NCO groups, the reaction being carried out in such a way that no ionic groups are obtained in the allyl urethane.

9. A process for the production of a lacquer, characterized in that an allyl urethane of the type claimed in claim 1 is dispersed in water and the resulting dispersion is provided with standard additives.

10. A process for coating rigid or flexible substrates, characterized in that a lacquer obtained by the process claimed in claim 9 is used.

* * * * *